US009509586B2

(12) United States Patent
Dunsbergen et al.

(10) Patent No.: US 9,509,586 B2
(45) Date of Patent: Nov. 29, 2016

(54) SYNTHETIC CLIENT

(71) Applicant: Aruba Networks Inc., Sunnyvale, CA (US)

(72) Inventors: Ben Dunsbergen, San Jose, CA (US); Gopalakrishna Raman, San Jose, CA (US); Partha Narasimhan, Saratoga, CA (US); Sathish Damodaran, San Jose, CA (US); Sheausong Yang, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 150 days.

(21) Appl. No.: 14/447,023

(22) Filed: Jul. 30, 2014

(65) Prior Publication Data

US 2016/0036683 A1 Feb. 4, 2016

(51) Int. Cl.
*H04L 12/26* (2006.01)
*H04L 29/06* (2006.01)

(52) U.S. Cl.
CPC .............. *H04L 43/50* (2013.01); *H04L 67/42* (2013.01)

(58) Field of Classification Search
CPC ..... H04L 43/045; H04L 29/06; H04L 67/42; H04L 43/50; H04W 88/06; G06F 17/3053
USPC .......................... 370/232, 389; 455/410, 419
See application file for complete search history.

(56) References Cited

U.S. PATENT DOCUMENTS

| 2003/0027551 A1* | 2/2003 | Rockwell ................ H04L 29/06 455/410 |
| 2004/0203694 A1* | 10/2004 | Wong ..................... H04W 88/06 455/419 |
| 2011/0310735 A1* | 12/2011 | Karagiannis .......... H04L 43/045 370/232 |
| 2015/0234832 A1* | 8/2015 | Gardner, III ........ G06F 17/3053 707/749 |

* cited by examiner

*Primary Examiner* — Jianye Wu
(74) *Attorney, Agent, or Firm* — Brooks, Cameron & Huebsch, PLLC (57) ABSTRACT

A system with a device including a hardware processor is configured to perform operations: receiving, by the device, a message over a wired medium, wherein the message has a frame including (a) a MAC address as a source MAC address for the frame and (b) a second MAC address as a destination MAC address for the frame, extracting, by the device, the frame from the message received over the wired medium, and wirelessly transmitting, by the device, the frame without modifying the source MAC address and without modifying the destination MAC address.

20 Claims, 7 Drawing Sheets

SYNTHETIC CLIENT

BACKGROUND

Wired and/or wireless networks are increasing in both size and popularity around the world. In a crowded city, it is not uncommon to be able to join tens or hundreds of different networks. Businesses have also been installing larger and more complex employee networks. When deploying a new network, large or small, and/or when upgrading or modifying an existing network, testing to ensure that the network is functioning correctly is of critical importance.

OVERVIEW

In general, in one aspect, the invention relates to a system. The system comprising: a first device including a hardware processor; the system being configured to perform operations comprising: receiving, by the first device, a first message over a wired medium, wherein the first message comprises a first frame including (a) a first MAC address as a source MAC address for the first frame and (b) a second MAC address as a destination MAC address for the first frame; extracting, by the first device, the first frame from the first message received over the wired medium; and wirelessly transmitting, by the first device, the first frame without modifying the source MAC address and without modifying the destination MAC address.

In general, in one aspect, the invention relates to a system. The system comprising: a hardware processor; the system being configured to perform operations comprising: generating a first frame comprising a first MAC address as a source MAC address of the first frame and a second MAC address as a destination MAC address of the first frame; and transmitting a first message on a wired medium to a first device, wherein the first message comprises the first frame in a data payload, wherein the first device extracts the first frame from the first message and wirelessly transmits the first frame without modifying the source MAC address of the first frame or the destination MAC address of the first frame.

In general, in one aspect, the invention relates to a non-transitory computer readable medium comprising instructions. The instructions, when executed by one or more devices, cause performance of operations comprising: generating a frame, wherein the frame comprises a source MAC address and a destination MAC address; sending, to a network device, a message comprising the frame, wherein the message is sent using a wired connection; extracting, by the network device, the frame from the message; wirelessly transmitting, by the network device, the frame to the destination MAC address; receiving a response to the frame; and forwarding, by the network device, the response via the wired connection.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for a synthetic client. Generally, a station engine determines what type of test(s) to run on a network, and generates messages for the testing network devices to send. The messages are fully formed and may not need to be modified by the testing network devices. Optionally, the testing network devices may modify the messages. The messages are sent to the testing network devices via a wired connection, and are subsequently broadcast by the testing network devices wirelessly. The testing network devices may receive responses to the broadcast messages and the responses may be relayed to the station engine via the wired connection. In other words, the network devices are turned into synthetic clients that are able to send and receive messages as if they were an actual client device connecting to the network. For example, depending on the messages sent and/or the purpose of the testing, the synthetic clients could be made to "roam" across the network from one network device to another. In this manner, the testing of a network may be managed.

Figure 1:
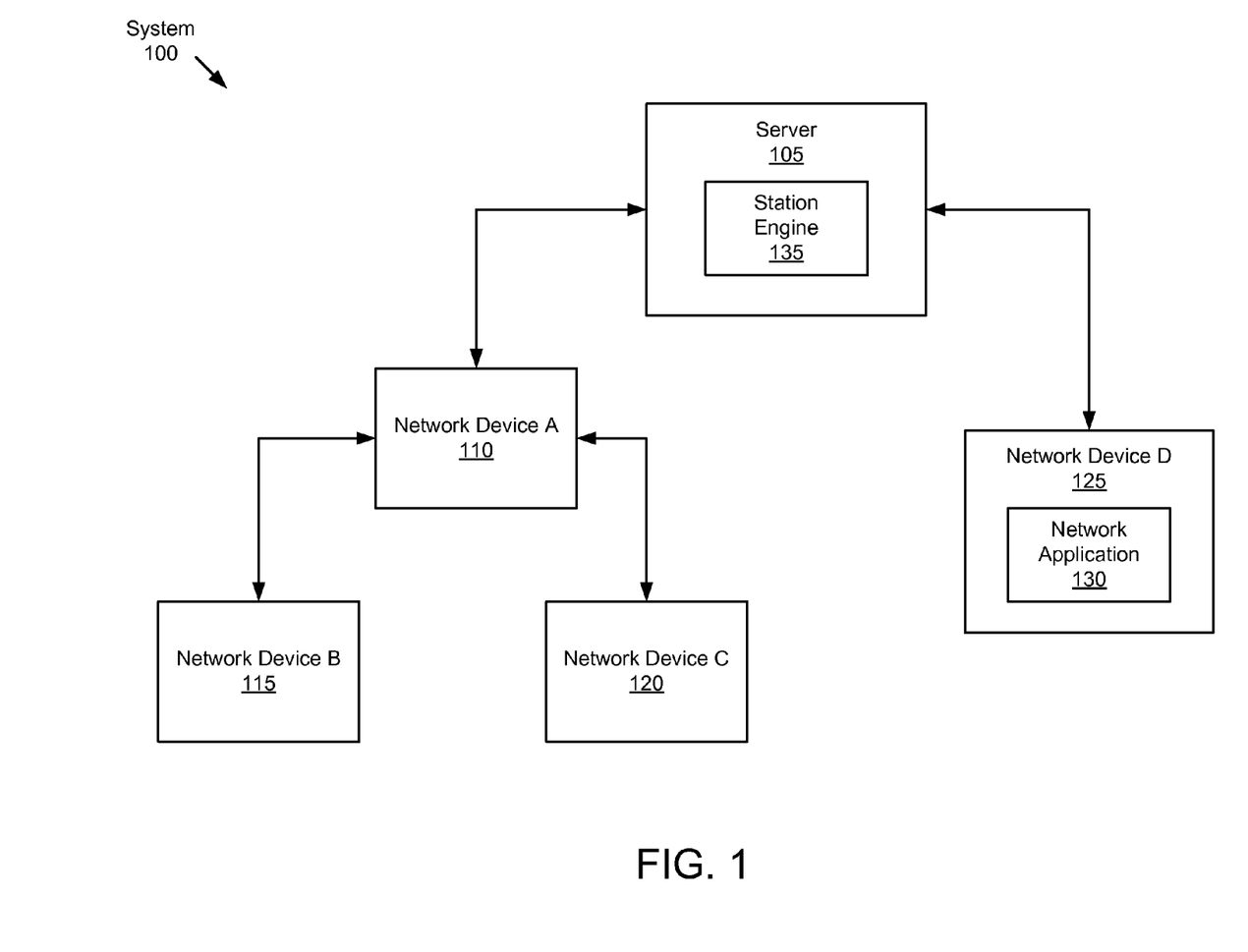
FIG. 1 shows a schematic diagram in accordance with one or more embodiments of the invention.

FIG. 1 shows a system (100) in accordance with one or more embodiments. As shown in FIG. 1, the system (100) has multiple components, including a server (105) with a station engine (130), one or more network devices (e.g., network device A (110), network device B (115), network device C (120), and network device D (125)), and one or more network application (130). In one or more embodiments, the server (105) and the network devices (110, 115, 120, and 125) are connected via a network. The network may be a network of any size including the Internet, and may contain any number of wired and/or wireless connections. Specifically, in one or more embodiments, the connection between server (105) and a given network device (e.g., network devices (110, 115, 120, and 125)), is a wired connection. In one or more embodiments, the network devices (110, 115, 120, and 125) are located within the same secondary network (e.g., an Internet Protocol (IP) subnet), and/or are in the same level (e.g., Level 2) in the Open Systems Interconnection Model (OSI). Alternatively, some network devices may be located in different secondary networks and/or on different levels from other network devices. In one or more embodiments, the server (105) is in a different secondary network (e.g., different IP subnet) and/or level than the network devices (110, 115, 120, and 125).

In one or more embodiments, server (105) is a server, rack, computer, laptop, smart phone, tablet computer, router, switch, controller, or other suitable device. In one or more embodiments, server (105) is a network device, as described below. Specifically, server (105) may be a back-end for a given network, and may be used to manage and/or test a network. In one or more embodiments, server (105) is owned, controlled, or operated, by a party different than the party that owns, controls, or operates one or more network device (110, 115, 120, and 125). Alternatively, server (105) may be owned, controlled, or operated by the same party as one or more network devices (110, 115, 120, and 125).

In one or more embodiments, each network device (110, 115, 120, and 125) is a hardware device that is configured to receive packets (e.g., unicast packets, multicast packets) and transmit the packets to other devices connected to the network device, such a client device (not shown), server (105), or other network devices (110, 115, 120, and 125). The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), a radio-frequency (RF) frontend, and numerous other elements and functionalities. The hardware processor(s) may be an integrated circuit for processing instructions. For example, the hardware processor(s) may be one or more cores, or micro-cores of a processor. Typically, network device (110, 115, 120, and 125) communicates with client devices (not shown). A client device may be any device capable of sending and/or receiving messages via a wired or wireless connection. Examples of a client device include a smartphone, tablet, computer, laptop computer, etc. Client devices may also be other network devices.

By way of an example, a client device may be directly wired or wirelessly communicatively connected to a single access point, which is directly communicatively connected to a single controller, which is connected to a network (not shown). In the example, the network device may be the access point, the controller, an access point that includes the functionality of a controller, a switch (e.g., mobility access switch), or other such device. Additionally, by way of an example, one network device may be a controller while another network device may be an access point. The network device that is the access point in the example may or may not be connected to the network via the network device that is a controller.

Access points are digital devices that may be communicatively coupled to one or more networks (e.g., Internet, an intranet, etc.). Access points may be directly connected to the one or more networks or connected via a controller. In other words, an access point may be directly connected to a particular controller. An access point may include a wireless access point (WAP) that communicates wirelessly with devices using WiFi®, Bluetooth®, or related standards and that communicates with a wired network. The communication may involve unicast frames or broadcast frames. A unicast frame is directed towards a single, specific device. A broadcast frame transmits the frame to all possible devices. Access points, and other network devices, may include functionality for processing and/or converting messages and/or frames. For instance, if an access point receives a frame, the frame may be processed by converting the frame into an IP packet. Alternatively, any other suitable method and/or format may be used.

In one or more embodiments, station engine (135) includes functionality for generating messages/packets for testing a network. Specifically, station engine (135) generates the frames which a network device will then send. A frame is a digital transmission unit that includes a sequence of bits that enables the receiver to detect the beginning and ending of the packet. The frame may also include any other suitable information, such as a media access control (MAC) address for the source of the message and/or the destination of the message. In one or more embodiments, the frames generated by station engine (135) may include a source MAC address that is not the MAC address associated with the network device that is sending the message. In other words, the source MAC address may be "fake" in that the source MAC address represents a client device that is not real. By using a "fake" source MAC address, it will appear to the receiving network device (110, 115, 120, and 125) as though one or more client devices are attempting to communicate with the network. The frame may be encrypted, either by server (105) or the network device (110, 115, 120, and 125) which sends the message. In one or more embodiments, the frame is sent to the intended sender (e.g., a network device (110, 115, 120, and 125)) via a wired connection. By utilizing a wired connection, the other network devices are not aware of the message being sent from the server (105). In one or more embodiments, station engine (135) is able to utilize real-time information from the network devices (110, 115, 120, and 125) when generating frames, in order to increase the accuracy and authenticity of the test being performed.

In one or more embodiments, station engine (135) includes functionality to generate frames for any testing purpose. For example, frames may be generated for the purpose of testing a client roaming across the network from one network device to the next. Alternatively, or in addition, load testing may be performed by having multiple "clients" sending/receiving messages and/or roaming. It will be apparent to one of ordinary skill in the art that many different aspects of a network may be tested and in many different ways and, as such, the invention should not be limited to the above examples. In one or more embodiments, station engine (135) includes functionality for generating IP packets, or other message formats, in addition to frames.

In one or more embodiments, station engine (135) includes functionality to receive responses to the messages it generates, and to process the responses. Specifically, after a network device (110, 115, 120, and 125) has sent the message to a destination, the destination may respond to the sending network device, or other suitable destination, with another message, which may be forwarded on to server (135) via the wired connection. Station engine (135) may process the messages and determine how to proceed according to the parameters of the particular test being performed on the network. In one or more embodiments, station engine (135) has access to real-time information as it relates to the network device(s) which are participating in the test, and may make decisions and/or generate frames based on or using real-time information.

In one or more embodiments, although network application (130) is shown on only network device D (125), network application (130) may be installed on any, or all, of the network devices (110, 115, 120, and 125). Network application (130) may be installed by the manufacturer of the network device, or may be installed by the user, administrator, or other suitable entity. Network application (130) includes functionality for receiving messages from station engine (135), extracting frames from messages, transmitting frames, modifying frames, receiving frames, and other functionalities for implementing the invention. In one or more embodiments, network application (130) requires minimal amounts of CPU and memory, thereby enabling even low-end network devices with limited processing power and/or memory to function as synthetic clients. In one or more embodiments, network application (130) may receive and transmit messages, frames, and other data using any format, standard, or method now known or later developed.

In one or more embodiments, network application (130) includes functionality for extracting frames from messages. The frames may be extracted in any manner now known or later developed, and may be transmitted to their intended destination without modification. Alternatively, network application (130) may modify the frames before transmitting the frames to their intended destination. For example, control information may be modified, such as timing information, frames may be encrypted, and/or any other suitable modification may be made. Network application (130) may transmit the frames to their intended destination via a wireless connection using any method now known or later developed. Similarly, network application (130) may handle the receipt of responses to the transmitted frames by forwarding any response to server (105).

Figure 2A:
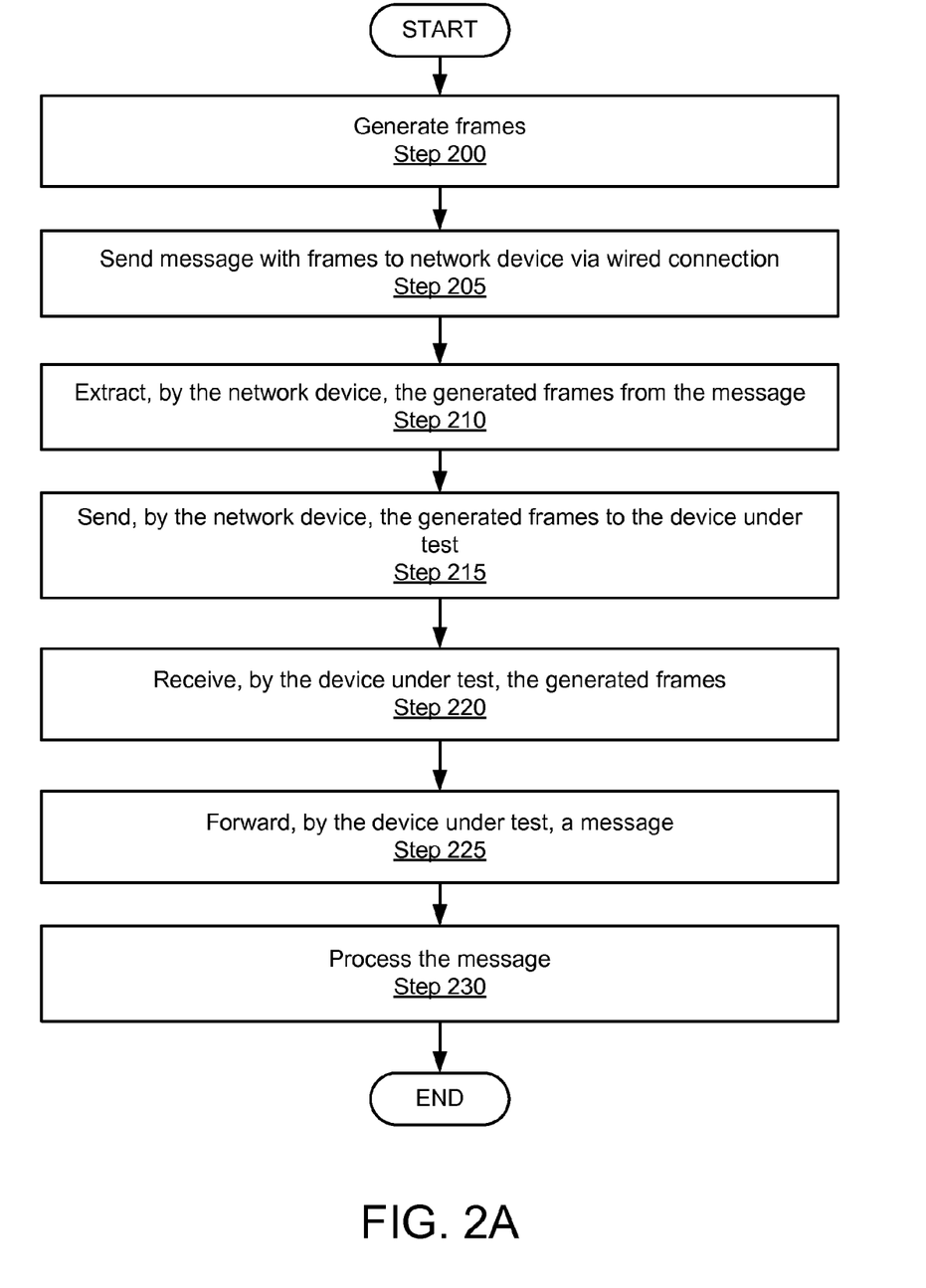
FIGS. 2A and 2B show flowcharts of a method in accordance with one or more embodiments of the invention.
Figure 2B:
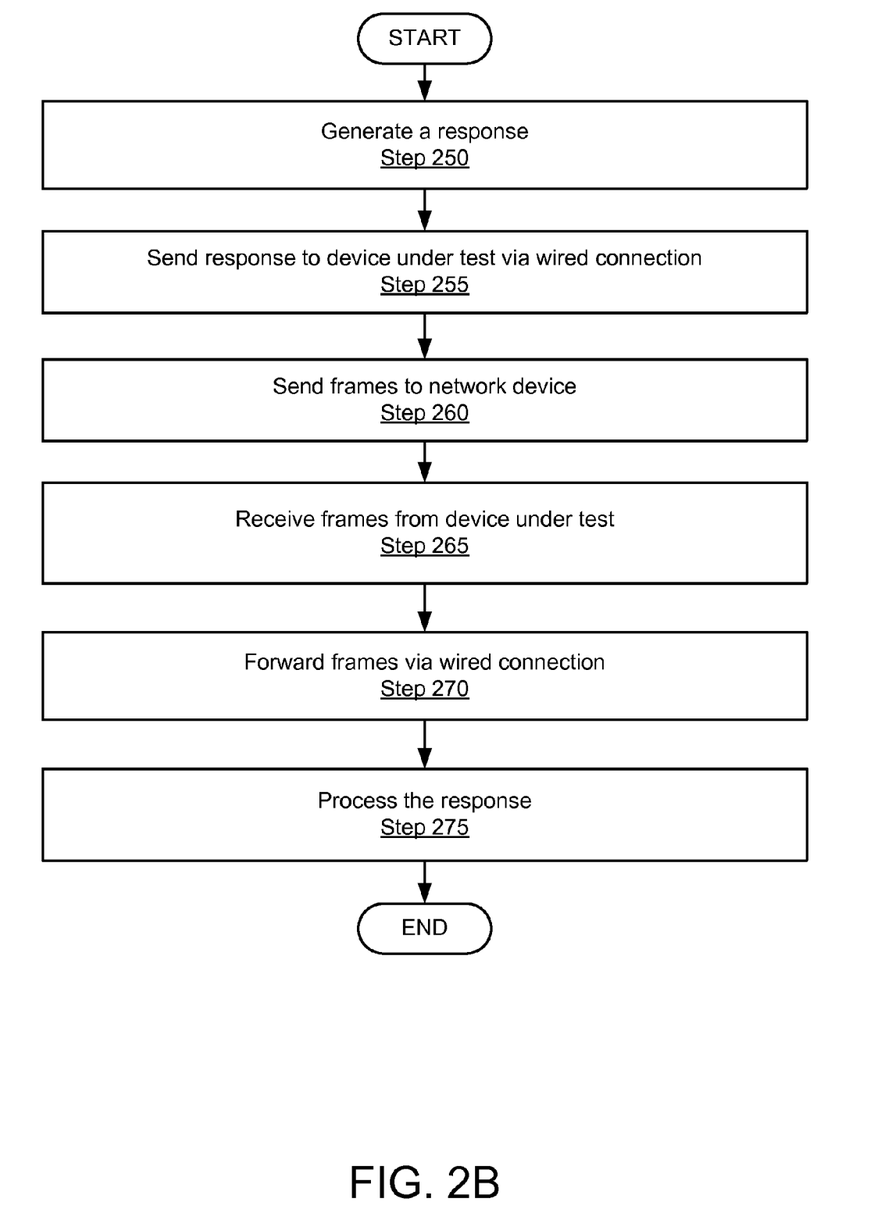

FIGS. 2A and 2B show a flowchart of a method for a synthetic client. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 2A and 2B should not be construed as limiting the scope of the invention.

In Step 200, frames are generated, in accordance with one or more embodiments. The frames may be generated in any manner now known or later developed. Specifically, the frames may be generated in a ready-to-send state, where the sending device does not need to modify the frames before sending. Further, the frames may include any suitable information such as a source MAC address and a destination MAC address. In one or more embodiments, the source MAC address may be "fake." In other words, the source MAC address may be an address for a device that is not real, and is used for testing purposes.

In Step 205, messages with the generated frames are sent to a network device via a wired connection, in accordance with one or more embodiments. The wired connection may be used to ensure that other network devices are not aware of the message being sent, to ensure that the management of the test does not interfere with the test, and/or any other suitable reason. In one or more embodiments, the generated frames may be encapsulated in a message in any format now known or later developed.

In Step 210, the generated frames are extracted from the message by the network device, in accordance with one or more embodiments. The generated frames may be extracted using any method now known or later developed. Optionally, after extraction, the frames may be modified by the network device. Any portion of the frames may be modified by the network device. For example, the frame may be encrypted, or timing information may be altered. Alternatively, the extracted frames may be sent as is, without any modification.

In Step 215, the generated frames are sent to the device under test by the network device, in accordance with one or more embodiments. The device under test may be identified, for example, by a destination MAC address, an Internet Protocol (IP) address, or any other address. In one or more embodiments, the device under test is included in the generated frames and the network device need not determine where to send the frames. Rather, the network device may simply forward the extracted frames. The frames may be sent to the device under test using a wireless connection. The frames may be sent using a unicast or a broadcast method. Optionally, the generated frames may take an indirect route to the device under test. In other words, there may be intermediate steps before the frames reach the device under test.

In Step 220, the generated frames are received by the device under test, in accordance with one or more embodiments. The frames may be received by the device under test in any manner now known or later developed. In one or more embodiments, the generated frames may be received via a wireless connection, and may be received via unicast or broadcast.

In Step 225, a message is forwarded by the device under test, in accordance with one or more embodiments. In one or more embodiments, the message includes the generate frames plus additional details and/or data added by the device under test. Alternatively, no additional details and/or data is added by the device under test. Optionally, the message may be a response generated by the device under test, rather than a simple forwarding of the generated frames. The message may be forwarded over a wired connection, and may return to the original device that generated the frames, such as a server.

In Step 230, the message is processed, in accordance with one or more embodiments. The message may be processed in any manner now known or later developed. The message may be processed to determine how the network is responding to the testing procedures (such as timing information, or other performance indicators), and/or to determine what frame to generate next. In one or more embodiments, the processing involves correlating the frames with the originally generated frames, and using this knowledge to derive timing information for the performance of the path used to send the message/frames. Alternatively, the message may be processed for any other suitable purpose. It will be apparent to one of ordinary skill in the art that the method described above creates a send-path loop from a server (or other suitable device), to the network device, to the device under test, and back to the server (or other suitable device). This loop enables the send path of the network to be tested and evaluated.

Turning to FIG. 2B, in Step 250, a response is generated, in accordance with one or more embodiments. The response may be generated in any manner now known or later developed. In one or more embodiments, the response may be an IP packet, rather than a frame. The IP packet may include specific data that enables a server, or other device, to correlate and/or track the IP packet as it flows through the network.

In Step 255, the response is sent to the device under test via the wired connection, in accordance with one or more embodiments. The response may be sent in any format and/or manner now known or later developed.

In Step 260, frames are sent to the network device, in accordance with one or more embodiments. Before the frames are sent, the device under test may convert the IP packet(s) into frames using any method now known or later developed. In one or more embodiments, during the conversion, additional data may be added. The frames may be sent to the network device via a wireless connection, using unicast or broadcast.

In Step 265, frames are received from the device under test, in accordance with one or more embodiments. The frames may be received, for example, by the same network device that sent the frames in Step 215. Alternatively, a different network device may receive the frames. The frames may be received in any manner now known or later developed.

In Step 270, frames are forwarded via the wired connection, in accordance with one or more embodiments. The frames may be forwarded with or without modification, and may be forwarded using any method now known or later developed. Specifically, in one or more embodiments, the frames are forwarded back to the device that originally generated the response in Step 250.

In Step 275, the response is processed, in accordance with one or more embodiments. The response may be processed in a manner similar to that described in Step 230. It will be apparent to one of ordinary skill in the art that the method described above creates a receive-path loop from a server (or other suitable device), to the device under test, to the network device, and back to the server (or other suitable device). This loop enables the receive path of the network to be tested and evaluated. Additionally, the send and receive paths may be independently measured and evaluated for a single communicating link (i.e., the device under test).

The following section describes various examples of the invention. The examples are included to aid in the understanding of the invention and are not intended to limit the scope of the invention.

FIG. 3A-3F show an example in accordance with one or more embodiments. Specifically, beginning with FIG. 3A, a network is shown. The network includes a server (300) and access points (access point A (305), access point B (310), and access point C (315)). Server (300) is connected to each of the access points (305, 310, and 315) via a wired connection, as shown by the solid lines connecting server (300) with the access points (305, 310, and 315). In this example, server (300) is a back-end server that is managing the testing of a network that includes the access points (305, 310 and 315). Each access point is associated with a MAC address: access point A (305) is associated with MAC address "A," access point B (310) is associated with MAC address "B," and access point C (315) is associated with MAC address "C."

Figure 3A:
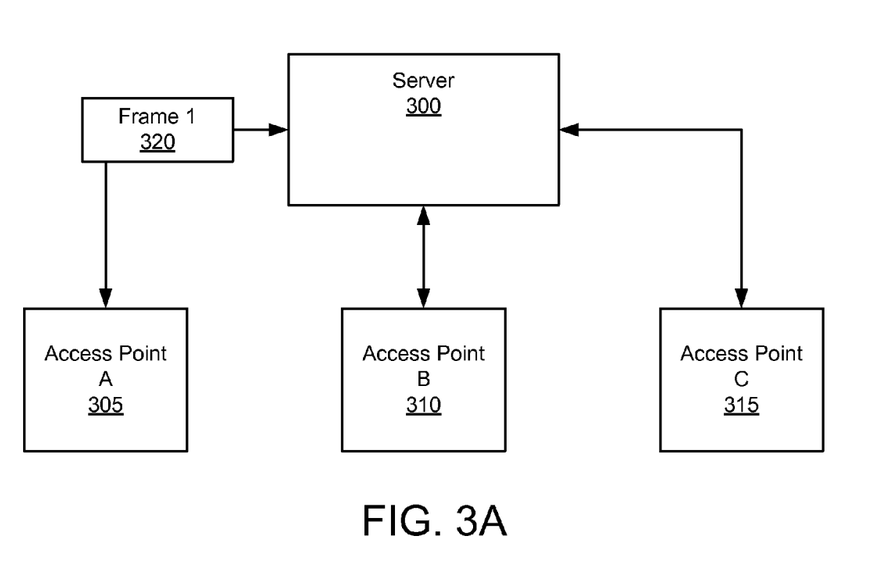
FIGS. 3A-3F show an example in accordance with one or more embodiments of the invention.

Server (300) begins the test by generating frame 1 (320). Frame 1 (320) includes, among other data, a source MAC address and a destination MAC address. The destination MAC address for frame 1 (320) is "B," meaning that frame 1 (320) is intended to be sent to access point B (310). The source MAC address is "Z." "Z" is not a MAC address associated with any of the access points. Rather, "Z" is an address used to simulate a client device connecting to the network. After generating frame 1 (320), server (300) uses the wired connection to transmit frame 1 (320) to access point A (305). The example continues in FIG. 3B.

Figure 3B:
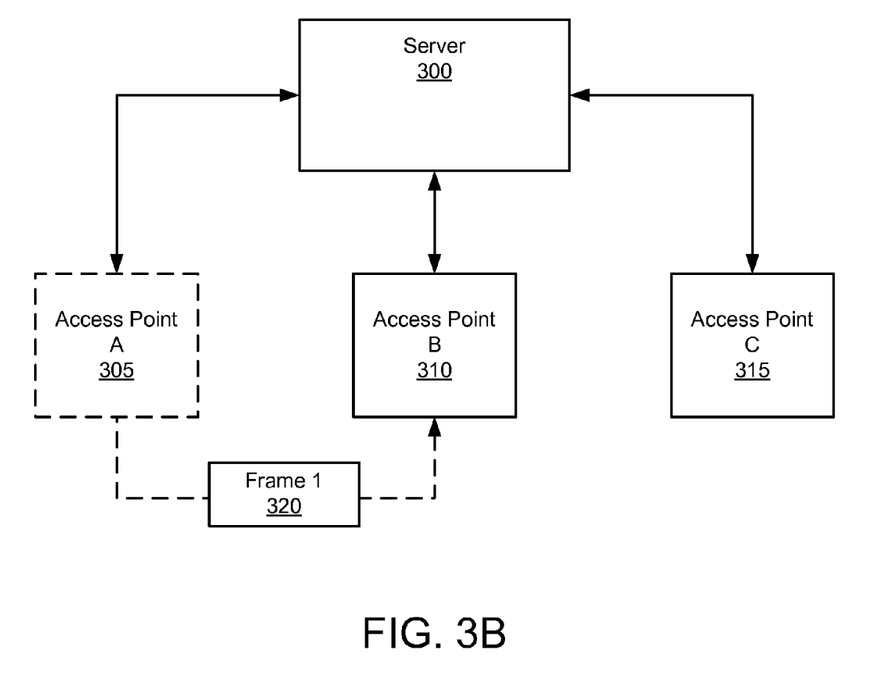
Figure 3C:
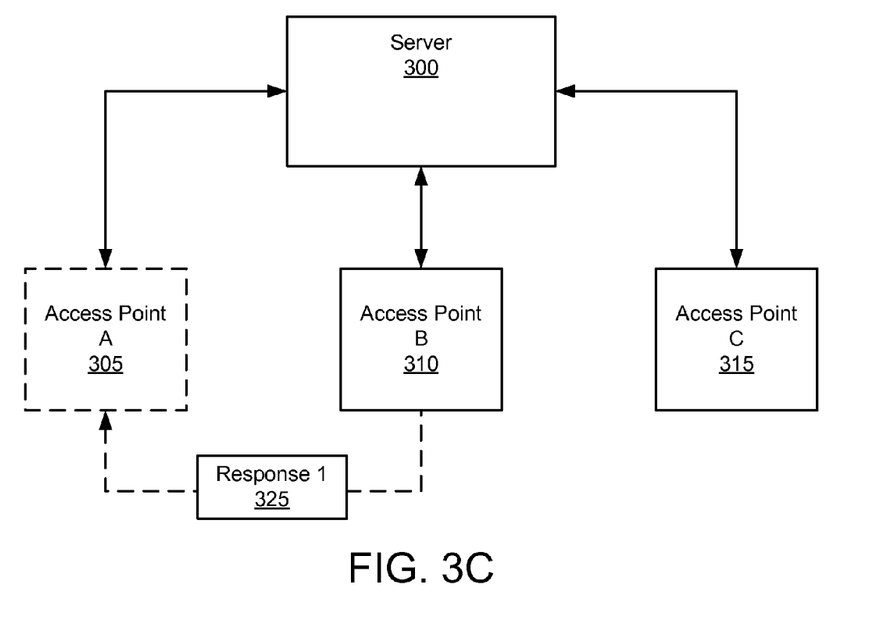
Figure 3D:
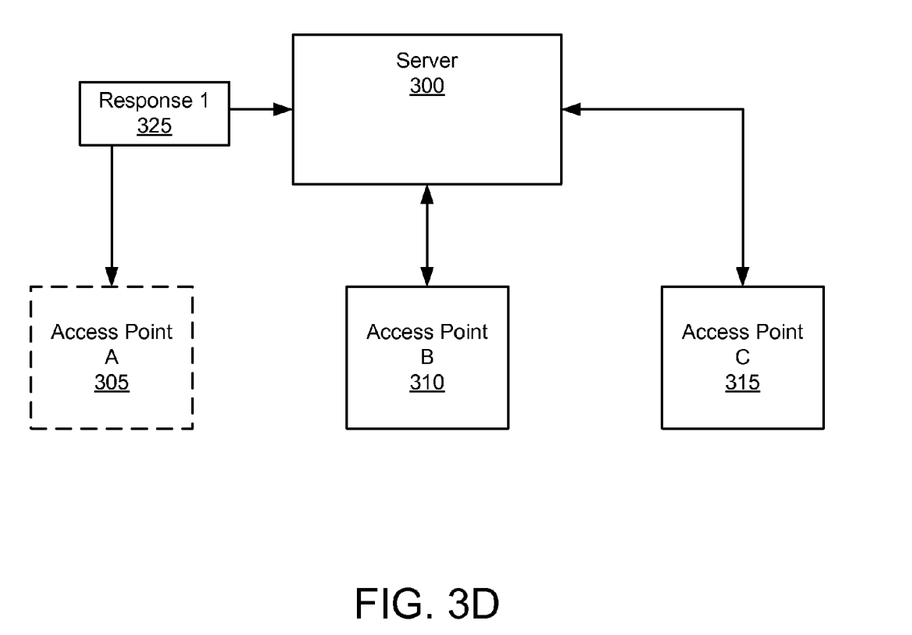

In FIG. 3B, access point A (305) has received frame 1 (320), and is now acting as a synthetic client, as indicated by the dotted lines. In this capacity, access point A (305) transmits frame 1 (320) to access point B (310) via a wireless connection, as indicated by the dotted arrow. When access point B (310) receives frame 1 (320), access point B (310) believes that an actual client is connecting to the network and, in FIG. 3C, sends response 1 (325), also using the wireless connection. Subsequently, in FIG. 3D, response 1 (325) is forwarded by access point A (305) to server (300). Server (300) is then able to process response 1 (325), and determine how to respond.

Figure 3E:
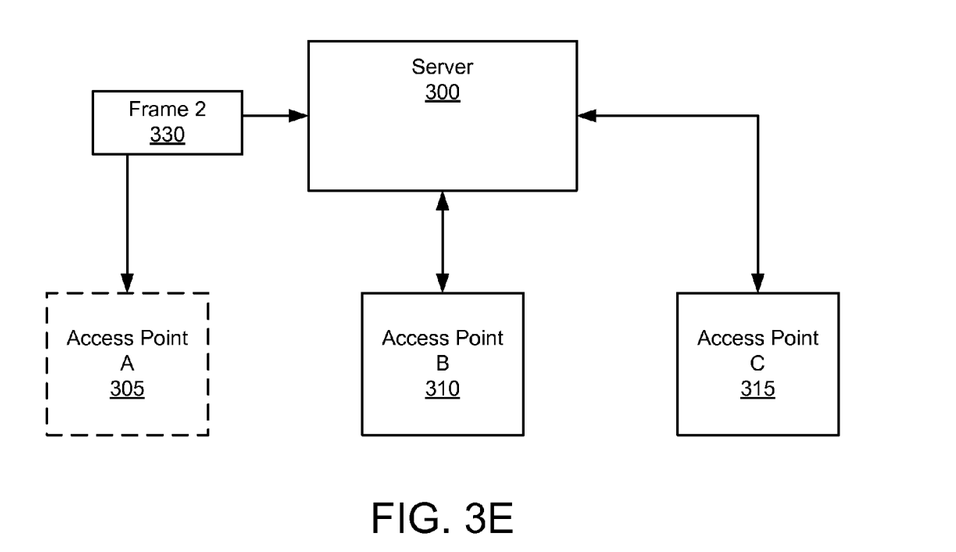
Figure 3F:
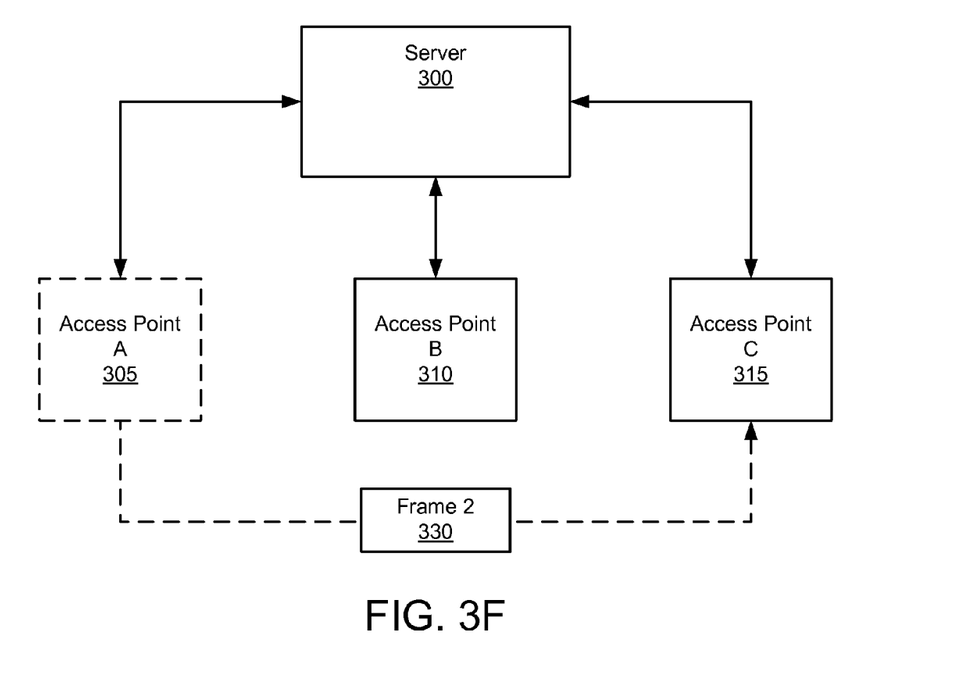

In FIG. 3E, server (300) has determined that a roaming event should be simulated. Thus, frame 2 (330) is generated, which still includes a source MAC address of "Z," but now with a destination MAC address of "C." As before, frame 2 (330) is sent to access point A (305) via the wired connection. Then, in FIG. 3F, frame 2 (330) is transmitted, wirelessly, to access point C (315). Although not depicted in further figures, access point C (315) would respond in a similar manner to how access point B (310) responded to frame 1 (320)—by wirelessly sending a response to access point A (305), which would then be forwarded on via the wired connection to server (300). In this manner, many different networks may be tested quickly and efficiently, without the additional effort of having to use a physical client device.

Figure 4:
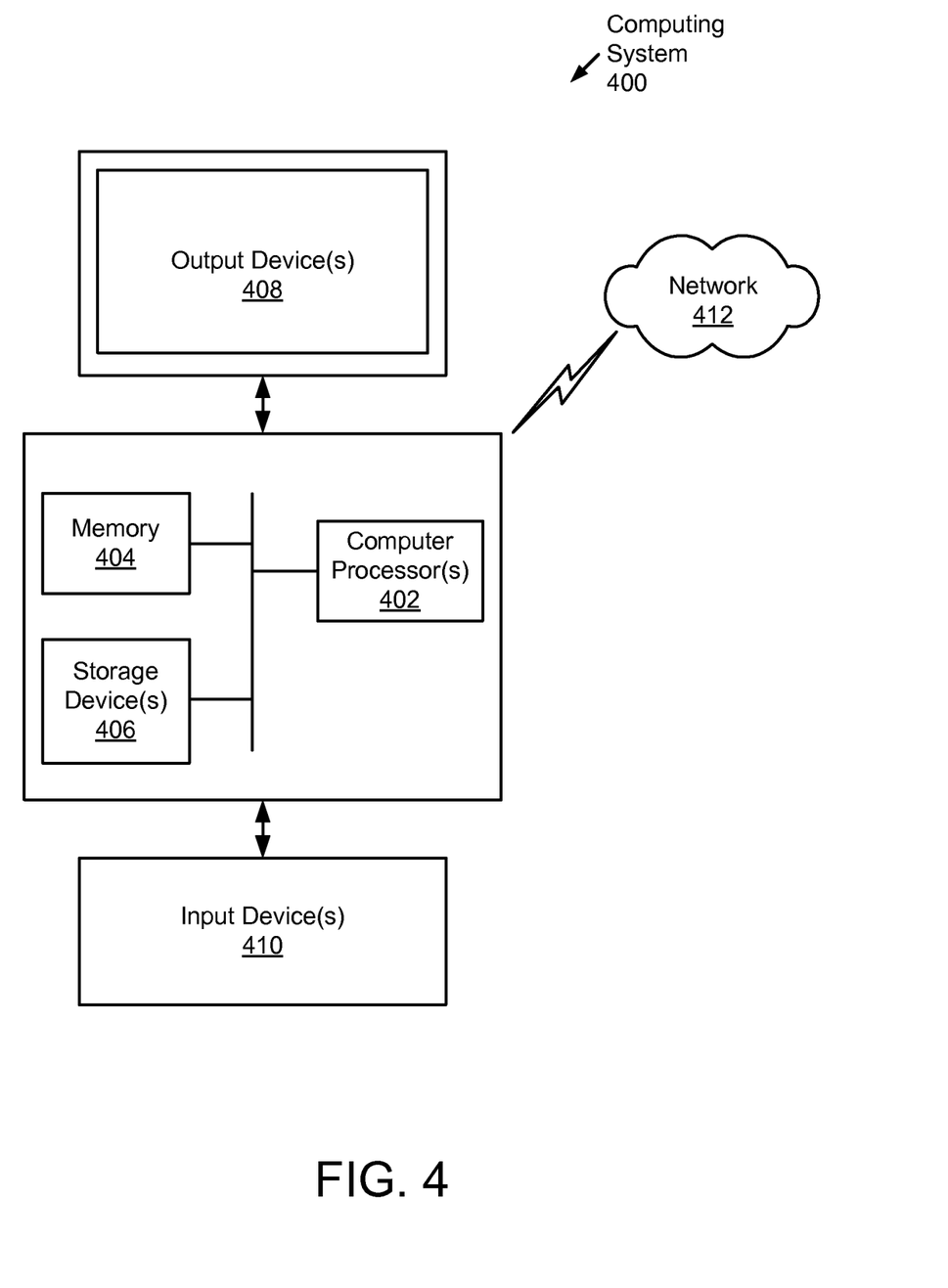
FIG. 4 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a first device including a hardware processor, the first device being configured to perform operations comprising:
receiving, at the first device; a first message over a wired medium from a source device that generated the first message, wherein the first message comprises a first frame including a first MAC address as a source MAC address for the first frame and a second MAC address as a destination MAC address for the first frame;
extracting, by the first device, the first frame from the first message received over the wired medium; and
wirelessly transmitting, by the first device, the first frame without modifying the source MAC address and without modifying the destination MAC address,
wherein the first device is a device other than a client corn device and wherein the source device is a device other than a client computing device.

2. The system of claim 1, wherein the first device does not modify any portion of the first frame, received in the first message on the wired medium, prior to wirelessly transmitting the first frame.

3. The system of claim 1, wherein the first device encrypts the first frame prior to wirelessly transmitting the first frame.

4. The system of claim 1, wherein the operations further comprise:
wirelessly receiving, at the first device, a second frame that is transmitted b a second device responsive to the second device receiving the first frame, the second frame including the second MAC address as a source MAC address for the second frame and the first MAC address as a destination MAC address for the second frame, wherein the second device is a device other than a client computing device; and
transmitting, by the first device, a second message over the wired medium, wherein the second message comprises the second frame including the second MAC address as the source MAC address for the second frame and the first MAC address as the destination MAC address for the second frame.

5. The system of claim 1, the first device acts as a synthetic client by wirelessly transmits the first message to a second device wherein the first MAC address of the first message does not identify the first device.

6. The system of claim 1, wherein the first device receives the first message over the wired medium from a second device that generated the first frame to be transmitted by the first device.

7. The system of claim 6, wherein the second device generated the first frame to be transmitted by the first device to test performance of a third device identified by the second MAC address.

8. A system, comprising:
a source device including a hardware processor, the source device being configured to perform operations comprising:
generating a first frame comprising a first MAC address as a source MAC address of the first frame and a second MAC address as a destination MAC address of the first frame; and
transmitting a first message on a wired medium to a first device, wherein the first message comprises the first frame in a data payload, wherein the first device extracts the first frame from the first message and wirelessly transmits the first frame without modifying the source MAC address of the first frame or the destination MAC address of the first frame,
wherein the first device is a device other than a client computing device and wherein the source device is a device other than a client computing device.

9. The system of claim 8, wherein the operations further comprise:
generating a second frame comprising the first MAC address as a source MAC address of the second frame and a second MAC address as a destination MAC address of the second frame;
transmitting a second message on the wired medium to a second device, wherein the second message comprises the second frame in a data payload, wherein the second device extracts the second frame from the message and wirelessly transmits the second frame without modifying the source MAC address of the second frame or the destination MAC address of the second frame,
wherein the second device is a device other than a client computing device.

10. The system of claim 9,
wherein the first device that transmits the first frame is located at a first location,
wherein the second device that transmits the second frame is located at a second location, and
wherein a third device that wirelessly receives the first frame and the second frame, determines that a particular device associated with the first MAC address moved from the first location to the second location.

11. The system of claim 8, wherein the source MAC address does not identify any real device.

12. The system of claim 8, wherein the operations further comprise:
evaluating a performance of a send-path loop between the source device, the first device, and a second device based on analysis of timing information of a second message received at the source device from the second device, wherein the second message is generated by the second device responsive to the second device receiving the first frame from the first device, and wherein the second device is a device other than a client computing device.

13. The system of claim 8, wherein the operations further comprise:
evaluating a performance of a receive-path loop between the source device, the first device, and a second device based on analysis of a second frame received at the source device from the first device, wherein the second frame is transmitted by the second device to the first device responsive to the second device receiving the first frame from the first device, and wherein the second device is a device other than a client device.

14. The system of claim 12, wherein the second device receives the first frame wirelessly and the source device receives the second frame on a wired medium.

15. The system of claim 13, wherein the source device receives the second frame on a wired medium and the second device receives the first frame wirelessly.

16. A non-transitory computer readable medium comprising instructions which, when executed by one or more devices, causes performance of operations comprising:
   receiving at a first network device a first message including a first frame, wherein the frame comprises a source MAC address and a destination MAC address, wherein the first frame was generated by a source device, and wherein the first message is received via a wired connection;
   extracting, at the first network device, the frame from the message;
   wirelessly transmitting, by the first network device, the frame to the destination MAC address;
   receiving a response to the frame from a second network device; and
   forwarding, by the first network device, the response via the wired connection,
   wherein the first network device is a device other than a client computing device, wherein the second network device is a device other than a client computing device, and wherein the source network device is a device other than a client computing device.

17. The non-transitory computer readable medium of claim 16, wherein the source MAC address does not identify a real device.

18. The non-transitory computer readable medium of claim 16, wherein the first network device transmits the first frame without modification.

19. The non-transitory computer readable medium of claim 16, wherein the first frame is generated to test the second network device associated with the destination MAC address.

20. The non-transitory computer readable medium of claim 16, wherein the first network device encrypts the first frame prior to wirelessly transmitting the frame.

* * * * *